(12) United States Patent
Teh et al.

(10) Patent No.: US 11,995,028 B2
(45) Date of Patent: *May 28, 2024

(54) SCALABLE NETWORK-ON-CHIP FOR HIGH-BANDWIDTH MEMORY

(71) Applicant: Intel Corporation, Santa Clara, CA (US)

(72) Inventors: Chee Hak Teh, Bayan Lepas (MY); Yu Ying Ong, Bayan Lepas (MY); George Chong Hean Ooi, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,237

(22) Filed: Dec. 27, 2022

(65) Prior Publication Data

US 2023/0135934 A1 May 4, 2023

Related U.S. Application Data

(63) Continuation of application No. 16/235,608, filed on Dec. 28, 2018, now Pat. No. 11,580,054.

(60) Provisional application No. 62/722,741, filed on Aug. 24, 2018.

(51) Int. Cl.
*G06F 15/78* (2006.01)
*G06F 13/16* (2006.01)
*G06F 13/40* (2006.01)

(52) U.S. Cl.
CPC ...... *G06F 15/7825* (2013.01); *G06F 13/1631* (2013.01); *G06F 13/1673* (2013.01); *G06F 13/4004* (2013.01)

(58) Field of Classification Search
CPC ............ G06F 15/7825; G06F 13/1631; G06F 13/1673; G06F 13/4004
See application file for complete search history.

(56) References Cited

U.S. PATENT DOCUMENTS

| | | | |
|---|---|---|---|
| 8,855,112 B2 | 10/2014 | Tokuoka | |
| 8,886,861 B2 | 11/2014 | Kwon et al. | |
| 9,225,665 B2 * | 12/2015 | Boucard | G06F 15/7825 |
| 9,755,997 B2 | 9/2017 | Li et al. | |
| 9,911,477 B1 | 3/2018 | Teh | |
| 10,673,439 B1 | 6/2020 | Ahmad et al. | |
| 10,769,080 B2 | 9/2020 | Luan et al. | |
| 11,036,660 B2 | 6/2021 | Ooi et al. | |
| 2012/0191896 A1 | 7/2012 | Fang et al. | |
| 2015/0103822 A1 | 4/2015 | Gianchandani et al. | |
| 2017/0046198 A1 | 2/2017 | Solihin et al. | |
| 2017/0220499 A1 | 8/2017 | Gray | |
| 2019/0044519 A1 | 2/2019 | Atsatt et al. | |

(Continued)

OTHER PUBLICATIONS

XILINX, AXI Block RAM (BRAM) Controller v4.1, LogiCORE IP Product Guide, Dec. 20, 2017, pp. 1-85.

*Primary Examiner* — Brian T Misiura
(74) *Attorney, Agent, or Firm* — Fletcher Yoder, PC

(57) ABSTRACT

Described herein are memory controllers for integrated circuits that implement network-on-chip (NoC) to provide access to memory to couple processing cores of the integrated circuit to a memory device. The NoC may be dedicated to service the memory controller and may include one or more routers to facilitate management of the access to the memory controller.

25 Claims, 12 Drawing Sheets

(56) References Cited

U.S. PATENT DOCUMENTS

| | | | |
|---|---|---|---|
| 2019/0050361 A1* | 2/2019 | Raghava | G06F 13/4027 |
| 2019/0197006 A1 | 6/2019 | Teh | |
| 2019/0214087 A1* | 7/2019 | Weinberg | G11C 7/1078 |
| 2019/0363717 A1 | 11/2019 | Swarbrick et al. | |
| 2022/0197855 A1* | 6/2022 | Ganusov | G06F 15/7867 |
| 2022/0358071 A1* | 11/2022 | Chen | G06F 13/4027 |

* cited by examiner

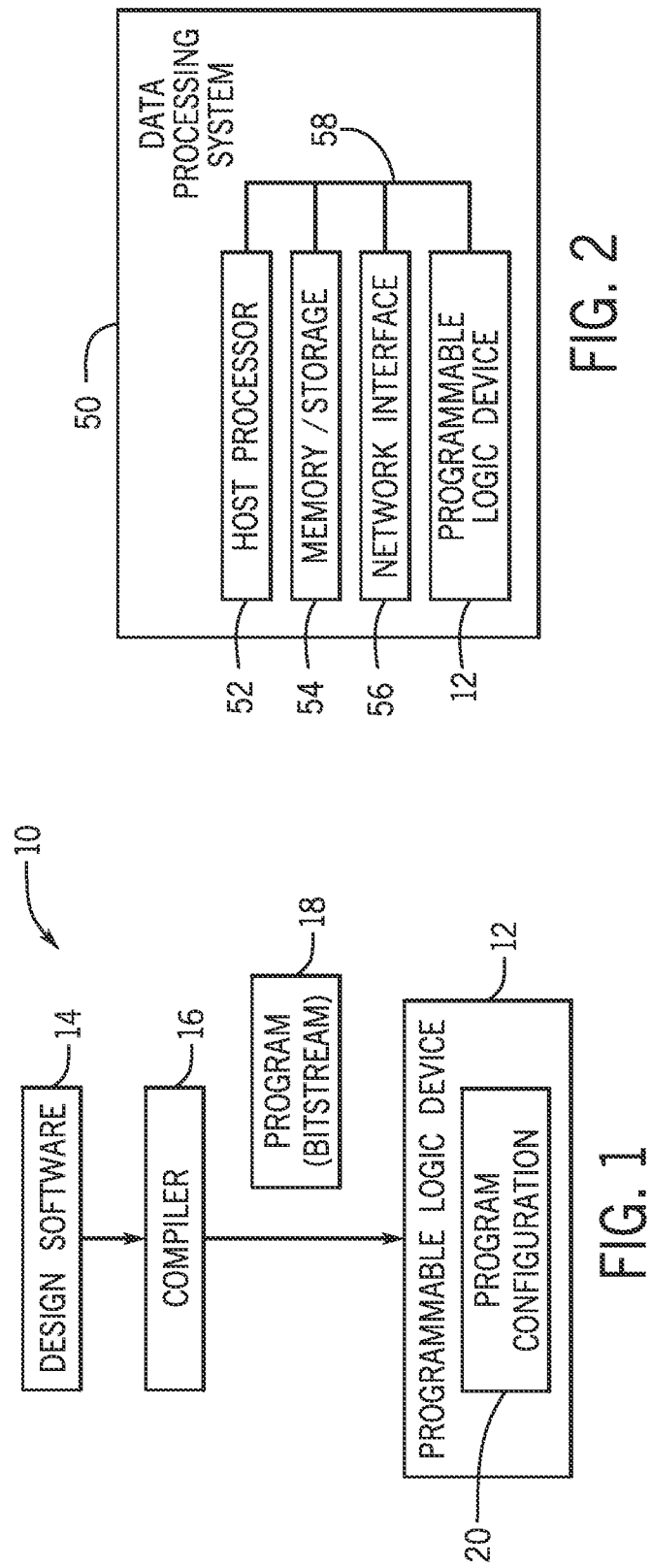

SCALABLE NETWORK-ON-CHIP FOR HIGH-BANDWIDTH MEMORY

CROSS REFERENCE TO RELATED APPLICATIONS

This application is a continuation of U.S. patent application Ser. No. 16/235,608, entitled "Scalable Network-on-Chip for High-Bandwidth Memory," filed on Dec. 28, 2018, which claims priority from and the benefit of U.S. Provisional Application Ser. No. 62/722,741, entitled "An Efficient And Scalable Network-On-Chip Topology For High-Bandwidth Memory, And Applications," filed Aug. 24, 2018, both of which are hereby incorporated by reference in its entirety for all purposes.

BACKGROUND

This disclosure relates to digital circuitry and, more specifically, to data routing circuitry in digital electronic devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Programmable logic devices are a class of integrated circuits that can be programmed to perform a wide variety of operations. A programmable logic device may include programmable logic elements that can be configured to perform custom operations or to implement one or more data processing circuits. The data processing circuits programmed in the programmable logic devices may exchange data with one another and with off-circuit devices via interfaces. To that end, the programmable logic devices may include routing resources (e.g., dedicated interconnects) to connect different data processing circuits to external interfaces (e.g., memory controllers, transceivers). As an example, certain devices may be configured in a System-in-Package (SiP) form, in which a programmable device, such as a field programmable gate array (FPGA) is coupled to a memory, such as a high bandwidth memory (HBM) using a high bandwidth interface. The FPGA may implement multiple data processing circuits that may access the HBM via the routing resources. As the amount of data, the speed of processing, and the number of functional blocks in a device increases, the routing resources may become insufficient to provide the requested access and, in some occasions, may become a bottleneck that may reduce the capacity of operation of the electronic device

BRIEF DESCRIPTION OF THE DRAWINGS

Various aspects of this disclosure may be better understood upon reading the following detailed description and upon reference to the drawings in which:

FIG. 1 is a block diagram of a programmable logic device that is programmed with a circuit design, in accordance with an embodiment;

FIG. 2 is a block diagram of a data processing system that may use the programmable logic device to rapidly respond to data processing requests, in accordance with an embodiment;

DETAILED DESCRIPTION OF SPECIFIC EMBODIMENTS

Figure 3:
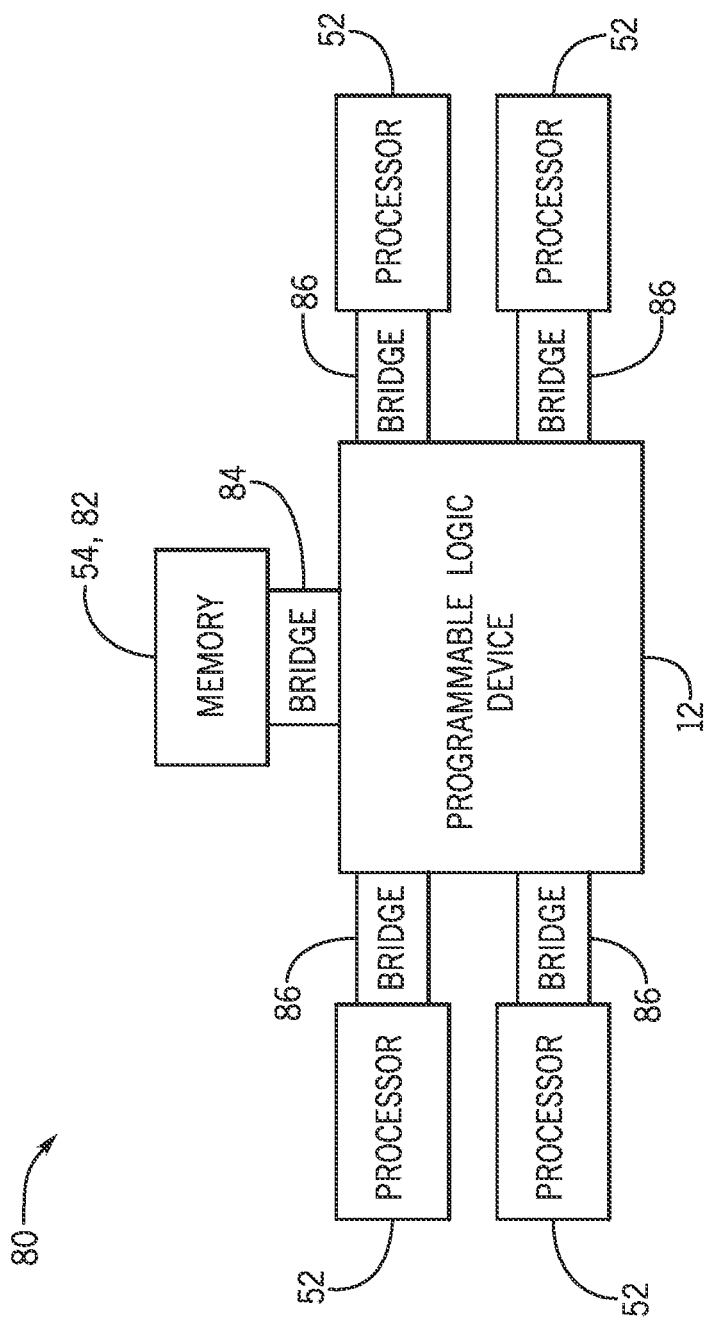
FIG. 3 is a block diagram of an electronic device including a System-in-Package (SiP) including a programmable logic device coupled to a memory device, in accordance with an embodiment.

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

The highly flexible nature of programmable logic devices makes them an excellent fit for accelerating many computing tasks. Programmable logic devices are increasingly being used as accelerators for machine learning, video processing, voice recognition, image recognition, and many other highly specialized tasks, particularly those that would be too slow or inefficient in software running on a processor. As the size and the complexity of programmable logic devices increase, there is increase in the number and in the amount of data processed by functional blocks (e.g., accelerators, processors, co-processors, digital signal processors) implemented within the programmable logic device. As a result of the increased amount of data exchanged between the cores and/or between core and external devices, a substantial amount of interconnect resources of the programmable device may be consumed. Moreover, in heterogeneous systems (e.g., systems with multiple processing units or cores with different operating frequencies and/or bandwidths), cores that require access to the memory may receive a pre-allocated amount of memory, which may be fixed. During operation, some cores may require more memory space than what was pre-allocated to them, while other cores may underutilize the memory space due to lower workloads. Managing such allocations may further complicate the tasks performed by the memory controllers.

In order to prevent bottlenecks in the access to external devices by cores of the programmable devices, advanced data routing topologies may be used. The present disclosure describes the use of router-based topologies, such as Network-on-Chip (NoC) topologies, to facilitate the connection with external interfaces, such as memory interfaces. The programmable logic device may have a NoC that connects multiple data processing cores of the programmable device to the memory interface. Moreover, the external interfaces (e.g., memory interfaces) may include a dedicated NoC connected to the FPGA NoC, to allow access to the interface using data packets. The dedicated NoC may also allow flexible routing for the data packets to decrease or prevent data congestion from simultaneous access to the interface by multiple data processing cores of the programmable device. The interface controllers described herein may be configurable to allow direct communication between cores in the programmable logic device and the interface, by employing bridges and/or configurable bypass modes to allow direct access to the memory controller. The NoC of the memory interface may also include virtual channels to allow prioritization of certain data packets through the interface to provide Quality-of-Service (QoS) functionality and grouping of multiple channels to allow wide interface connection between a data processing core and the interface. The systems described herein may be used, for example, in System-in-Package (SiP) devices in which processors and memory devices may be coupled with a field programmable gate array (FPGA) device in a single package, coupled by high bandwidth interfaces (e.g., 2.5D interfaces, interconnect bridges, microbump interfaces).

By way of introduction, FIG. 1 illustrates a block diagram of a system 10 that may employ a programmable logic device 12 that can be configured to implement one or more data processing cores, in accordance with embodiments presented herein. Using the system 10, a designer may implement logic circuitry to implement the data processing cores on an integrated circuit, such as a reconfigurable programmable logic device 12, such as a field programmable gate array (FPGA). The designer may implement a circuit design to be programmed onto the programmable logic device 12 using design software 14, such as a version of Intel® Quartus® by Intel Corporation of Santa Clara, California. The design software 14 may use a compiler 16 to generate a low-level circuit-design defined by bitstream 18, sometimes known as a program object file and/or configuration program, which programs the programmable logic device 12. Thus, the compiler 16 may provide machine-readable instructions representative of the circuit design to the programmable logic device 12. For example, the programmable logic device 12 may receive one or more configuration programs (bitstreams) 18 that describe the hardware implementations that should be stored in the programmable logic device 12.

A configuration program (e.g., bitstream) 18 may be programmed into the programmable logic device 12 as a configuration program 20. The configuration program 20 may, in some cases, represent one or more accelerator functions to perform for machine learning, video processing, voice recognition, image recognition, or other highly specialized task. The configuration program 20 may also include data transfer and/or routing instructions to couple the one or more data processing cores to each other and/or to external interfaces, such as processors, memory (e.g., high bandwidth memory (HBM), volatile memory such as random-access memory (RAM) devices, hard disks, solid-state disk devices), or serial interfaces (Universal Serial Bus (USB), Peripheral Component Interconnect Express (PCIe)).

The programmable logic device 12 may be, or may be a component of, a data processing system. For example, the programmable logic device 12 may be a component of a data processing system 50, shown in FIG. 2. The data processing system 50 may include one or more host processors 52, memory and/or storage circuitry 54, and a network interface 56. The data processing system 50 may include more or fewer components (e.g., electronic display, user interface structures, application specific integrated circuits (ASICs)), which may be coupled to one another via a bus 58. The host processor 52 may include one or more suitable processors, such as an Intel® Xeon® processor or a reduced-instruction processor (e.g., a reduced instruction set computer (RISC), an Advanced RISC Machine (ARM) processor) that may manage a data processing request for the data processing system 50 (e.g., to perform machine learning, video processing, voice recognition, image recognition, data compression, database search ranking, bioinformatics, network security pattern identification, spatial navigation, or the like). The memory and/or storage circuitry 54 may include random access memory (RAM), read-only memory (ROM), one or more hard drives, flash memory, or the like. The memory and/or storage circuitry 54 may be considered external memory to the programmable logic device 12 and may hold data to be processed by the data processing system 50. In some cases, the memory and/or storage circuitry 54 may also store configuration programs (bitstreams) for programming the programmable logic device 12. The network interface 56 may allow the data processing system 50 to communicate with other electronic devices. The devices in the data processing system 50 may include several different packages or may be contained within a single package on a single package substrate (e.g., System-in-Package (SiP)).

In one example, the data processing system 50 may be part of a data center that processes a variety of different requests. For instance, the data processing system 50 may receive a data processing request via the network interface 56 to perform machine learning, video processing, voice recognition, image recognition, data compression, database search ranking, bioinformatics, network security pattern identification, spatial navigation, or some other specialized task. The host processor 52 may cause the programmable logic fabric of the programmable logic device 12 be programmed with a particular accelerator related to requested task. For instance, the host processor 52 may instruct that configuration data (bitstream) stored on the storage circuitry 54 or cached in a memory of the programmable logic device 12 be programmed into the programmable logic fabric of the programmable logic device 12. The configuration data (bitstream) may represent multiple data processing circuits that implement accelerator functions relevant to the requested task. The processing cores in the programmable logic device 12 may then retrieve data from an interface (e.g., memory interface, network interface) and/or from the processor to perform the requested task. The presence of the dedicated NoC in the interfaces, as described herein, may allow quick performance of the required tasks. Indeed, in one example, an accelerator core may assist with a voice recognition task less than a few milliseconds (e.g., on the order of microseconds) by rapidly exchanging and processing large amounts of data with a high bandwidth memory (HBM) device (e.g., storage circuitry 54) coupled to the programmable logic device 12.

In some systems, the programmable logic device 12 may be connected to memory devices and/or processor devices via high bandwidth interfaces. FIG. 3 illustrates a schematic diagram of a System-in-Chip (SiP) 80 that may include a programmable logic device 12. The programmable logic device 12 may be connected to processors 52 and to a storage circuitry 54, which may be a high bandwidth memory (HBM) 82. The connection between the programmable logic device 12 and the memory 82 may take place via a high-bandwidth bridge 84. The high-bandwidth bridge 84 may be a 2.5D bridge, a 3D bridge, a microbump bridge, an interconnect bridge, or any other multi-channel interconnect. The programmable logic device 12 may be connected to processors 52 through bridges 86. In some embodiments, bridges 86 may be high bandwidth bridges similar to the high-bandwidth bridge 84, such as in systems that benefit from high data rate transfers between processors 52 and the programmable logic device 12. In some embodiments, bridges 86 may be regular interfaces (e.g., serial interfaces, 1D interconnects).

Figure 4:
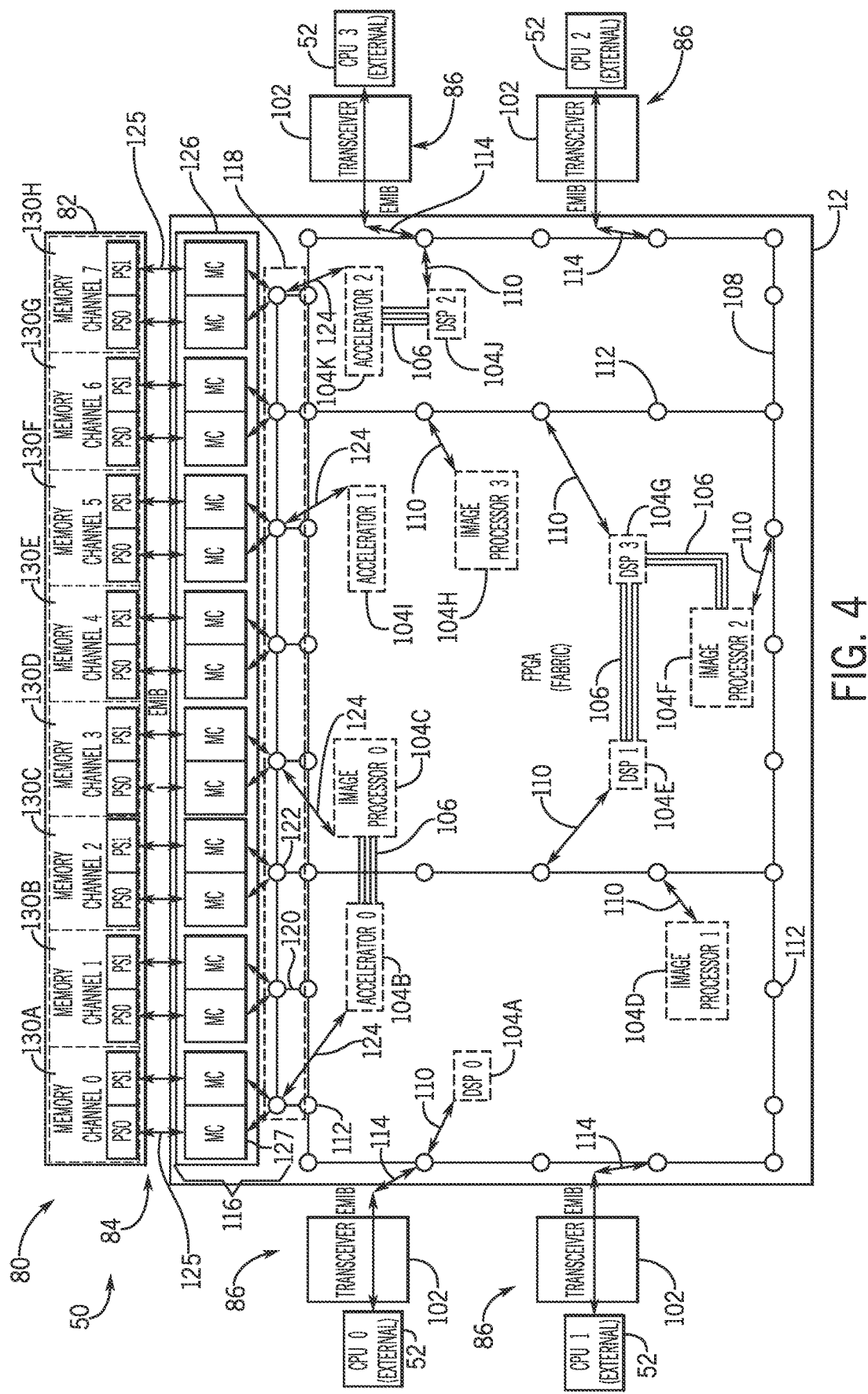
FIG. 4 is a diagram of programmable logic device having a memory interface with a dedicated Network-on-Chip (NoC) for routing data to and from memory control circuitry, and that is connected to the programmable logic device NoC, in accordance with an embodiment.

FIG. 4 illustrates a diagram of a data processing system 50 which may include a SiP 80, such as that of FIG. 3. The SiP 80 may include a programmable logic device 12 connected to an HBM 82 via a high-bandwidth bridge 84. The SiP 80 may also be connected to external processors 52, via bridges 86. The connection through bridges 86 may include transceivers 102 to allow serial connection. As discussed above, the programmable logic device 12 may implement one or more data processing cores 104A-K. Specifically, the diagram of FIG. 4 illustrates digital signal processing (DSP) cores 104A, 10E, 104J, 104G, accelerator cores 104B, 104I, and 104K, and image processing cores 104C, 104D, 104F, and 104H. The illustration is merely descriptive, and other number and/or types of descriptions may be employed.

In order to exchange data, the data processing cores 104A-K may be directly connected using a direct interconnect 106 of the programmable logic device 12. As discussed above, the routing through the direct interconnects 106 may be programmed in the configuration of the programmable logic device 12 (e.g., bitstream 18 of FIG. 1), as discussed above. The data processing cores 104A-K may also exchange data using the Network-on-Chip (NoC) 108 of the programmable logic device. To that end, the cores may exchange data packets through NoC interconnects 110 with a NoC router 112 of the NoC 108. The data packets sent via the NoC 108 may include destination address information for appropriate routing and/or priority information to provide quality of service (QoS) in the data transmission. The NoC routers 112 of the NoC 108 may inspect the destination address information and/or the header and route the data packages to the appropriate router or processor core. The processors 52 may also access the NoC 108 through NoC interconnects 114 coupled to the bridges 86. The NoC 108 may also be coupled to the HBM 82 via a memory controller 116, as illustrated. The presence of the NoC 108 may allow flexible exchange of data between data processing cores 104A-K, the HBM 82, and the processors 52, through an efficient use of routing resources in the programmable logic device 12.

The memory controller 116 may include a dedicated memory controller NoC 118. The memory controller NoC 118 may be connected to the NoC 108 via router-to-router NoC links 120. The NoC links 120 may allow transmission of data packets between the NoC routers 112 and the memory controller routers 122 of the memory controller NoC 118. The memory controller NoC 118 may also be directly accessed by the data processing cores 104A-K via direct memory controller interconnects 124, as illustrated. In some embodiments, the data processing cores 104A-K may provide data packets in the NoC protocol via the direct memory controller interconnects 124. In some embodiments, the data processing cores 104A-K may employ a protocol compatible with the memory controller. In such embodiments, bridge circuitry may be used to translate between the NoC protocol and the memory protocol, as detailed below.

The high-bandwidth bridge 84 may include multiple physical data links 125. The routers 122 of the memory controller NoC 118 may access the data links 125 via the memory channel circuitry 126 of the memory controller 116. In some embodiments, memory channel circuitry 126 may include hardened circuitry. The memory channel circuitry 126 may include multiple memory channel interfaces 127, which manage the access to the data links 125. Each memory channel interface 127 may connect with a memory channel 130A-H of the HBM 82. A bridge circuitry may be used to convert the data packets from the memory controller router 122 to the memory protocol employed by the memory channel interface 127 (e.g., a memory interface protocol).

Figure 5:
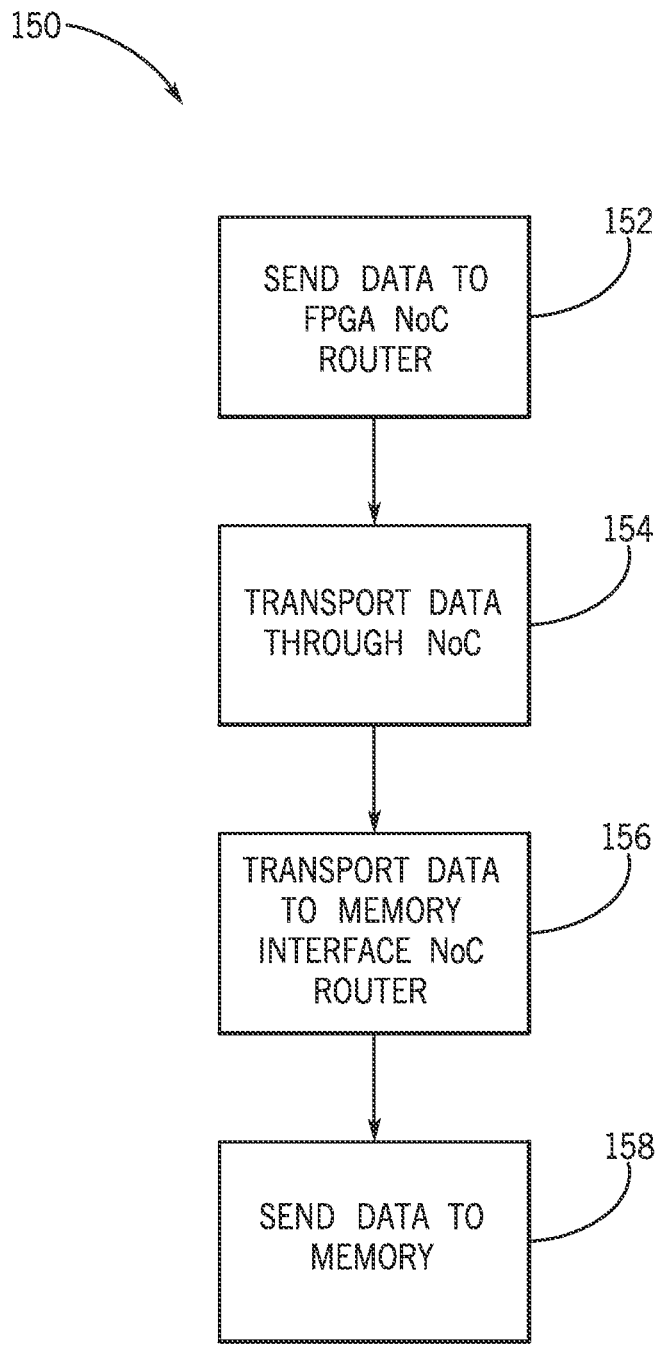
FIG. 5 is a flow chart diagram of a method to exchange data with a memory device using a memory interface with a dedicated NoC, in accordance with an embodiment.

The flow chart 150 in FIG. 5 illustrates a method that may be used by data processing cores (e.g., data processing cores 104A-K in FIG. 4) to access the memory device (e.g., HBM 82 of FIG. 4) using the programmable logic device NoC (e.g., NoC 108) and the memory controller NoC 118. In process block 152, the data directed to the memory device is sent by the data processing core to a router of the programmable logic device NoC. The data may be packaged in a NoC protocol and may include a header having an address and/or a priority information. In process block 154, the programmable logic device NoC transports the data through its routers to a router connected to the memory controller NoC using a header information. In process block 156, the data is transferred from the programmable logic device NoC to the memory controller NoC. Such process may take place by a router-to-router link, such as the NoC links 120 illustrated in FIG. 4.

In process block 158, the data is sent from the memory controller NoC to the hardened memory controllers and, subsequently, to the memory via one of the channels. In this process, the data packet in the NoC format may be converted to a format employed by the memory controller that may be compatible with the memory device. The flow chart 150 is illustrative of methods to interact with memory using a memory controller with a dedicated NoC. Methods to retrieve data from the memory to a data processing core and methods to exchanged data between memory and other devices attached to the programmable logic device (e.g., processors) can be obtained by adapting flow chart 150.

Figure 6:
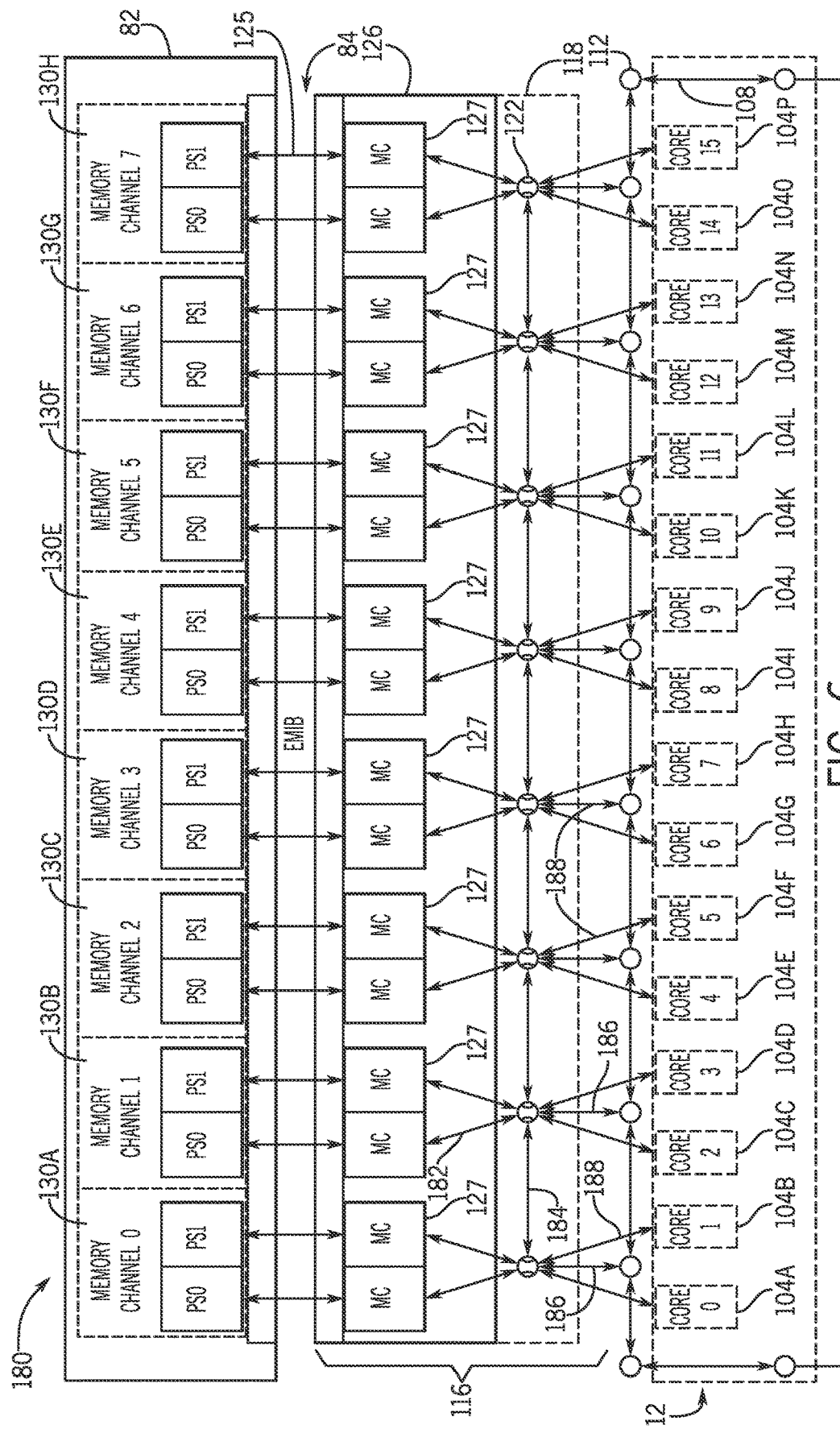
FIG. 6 is a block diagram of a memory interface having a dedicated NoC, in accordance with an embodiment.

The diagram 180 in FIG. 6 illustrates the flexibility of data exchanges that may take place between the programmable logic device 12 and the HBM 82 using the memory controller NoC 118. The memory controller NoC 118 may be accessed through the NoC 108, using the NoC protocol, or directly by data processing cores 104A-P, using an interconnect protocol that is compatible with the memory interface (e.g., a memory interface protocol). In diagram 180, the memory controller NoC 118 includes 8 routers 122. Each memory controller router 122 may connect to memory channel interfaces 127 through a connection 182. Specifically, each router 122 is connected to two memory channel interfaces 127, and each channel interfaces 127 is connected to a port of a memory channel 130A-H via data links 125. The routers 122 may also connect to each other through connections 184 that form the memory controller NoC 118. The connections 184 may allow an alternative routing that may mitigate congestion in the programmable logic device NoC 108.

Each memory controller router 122 may also be connected to NoC routers 112 of the programmable logic device NoC 108. In the diagram 180, each router 122 is connected to a single NoC router 112. This connection may be used to transport data packets from the programmable logic device 12 to the HBM 82 via the programmable logic device NoC 108, as discussed above. The routers 122 may also be connected directly to data processing cores 104A-P through dedicated interconnects 188, as illustrated. In the diagram, each router 122 is coupled to two processing cores via two dedicated interconnects 188. The data processing cores 104A-P may be configured to access the router 122 using an memory interface protocol and, as detailed below, bridge circuitry may be used to allow the router to process data packets from the NoC router 112 and memory access requests from data processing cores 104A-P.

More generally, the memory controller NoC 118 may, effectively, operate as a crossbar between the programmable fabric of the programmable logic device 12 and the high bandwidth memory 82. In the illustrated example, the memory controller NoC 118 may operate as a 16×16 crossbar that may allow any of the data processing cores 104A-P to access any of the 16 memory channels through any of the 16 inputs of the NoC routers 122, independent from the location of the data processing core. It should be understood that other crossbar dimensions for the memory controller NoC 118 may be obtained (e.g., 8×8, 32×32, 64×64) by adjusting the number of routers 122 and the number of memory channels 127 in the memory channel circuitry 126, to support other versions of memory, (e.g., HBM3 that may have 32 pseudo channels).

Figure 7:
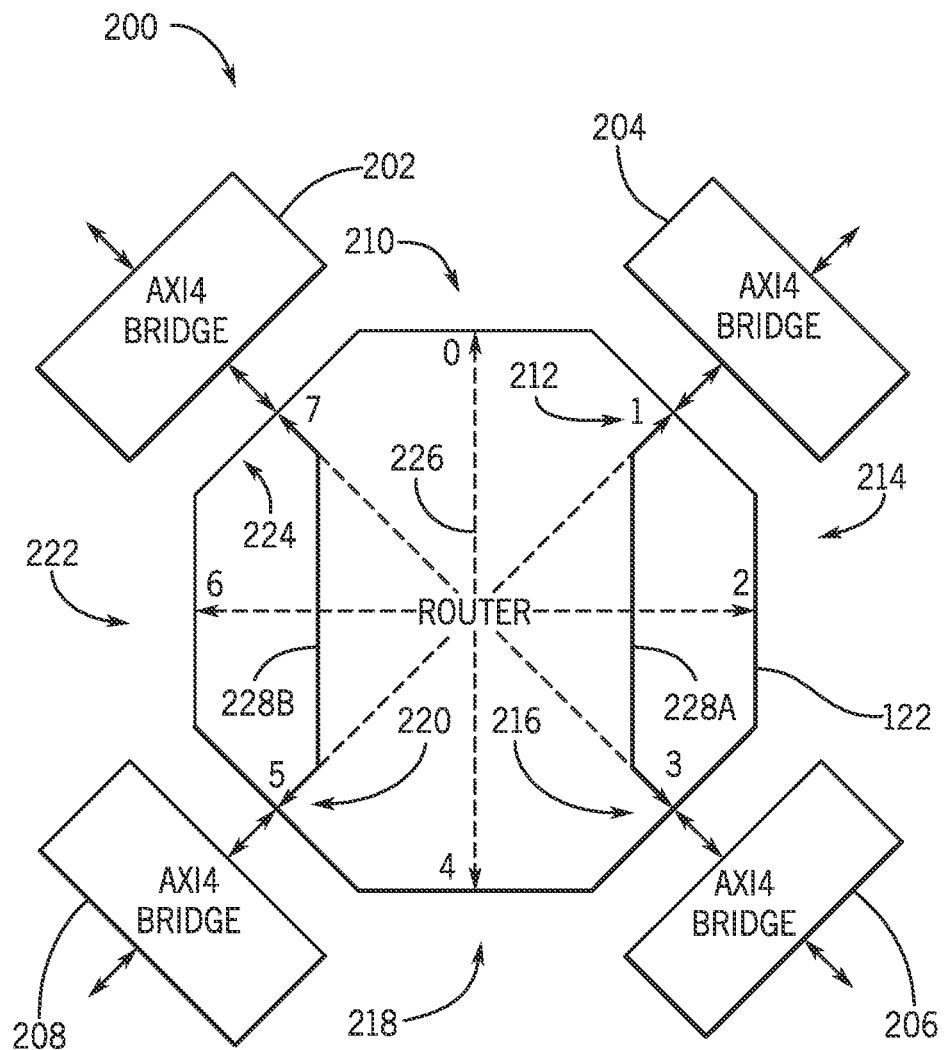
FIG. 7 is a diagram of a router that may be used by the dedicated NoC of the memory interface, in accordance with an embodiment.

The diagram 200 in FIG. 7 illustrates the memory controller router 122. As discussed above, the memory controller router 122 may receive data packets from the programmable logic device NoC 108, from a neighboring memory controller router 122 of the memory controller NoC 118, or from a direct access by a data processing core 104. Moreover, the memory controller router 122 may interact with a memory channel interface 127. As the NoC router may employ data packets in a NoC protocol that may be different from the protocol of the memory interface, bridge circuitry may be used to translate between the protocols. To that end, the memory controller router 122 may be connected to two memory-side bridges 202 and 204, and two device-side bridges 206 and 208. The memory-side bridges 202 and 204 may be used to connect the memory controller router 122 to the memory channel interfaces 127 and the device-side bridges 206 and 208 may be used to provide direct access to the memory controller router 122 by data processing cores 104 in the fabric of the programmable logic device 12. The illustrated bridges 202, 204, 206, and 208 may be compliant with an interconnect protocol that is compatible with the memory interface (e.g., a memory interface protocol), such as an Advanced Extensible Interface 4 (AXI4) protocol. It should be noted that the bridges may comply with other protocols, including Advanced Microcontroller Bus Architecture (AMBA) protocols which may include AXI3 or other AXI protocols, lite versions such as AXI-Lite protocols, and coherence extensions, such as AXI Coherency Extensions (ACE) or ACE-Lite protocols, and Avalon Interface protocols. This operation is detailed further in FIG. 8.

A memory controller router 122 may have multiple ports. The illustrated memory controller router 122, may have 8 ports 210, 212, 214, 216, 218, 220, 222, and 224. The ports may be connected to each other through a crossbar 226. Ports may, generally, receive and/or transmit data packets in the NoC protocol format. For example, ports 214 and 222 may be used to connect to neighboring NoC routers 122 of the memory controller NoC 118 and port 218 may be used to connect to a NoC router 112 of the programmable logic device NoC 108. Ports 216 and 220 may be used to provide direct data access by data processing cores through bridges 206 and 208, respectively. Ports 212 and 224 may be used to exchange data with the HBM 82 via the memory channel interface 127 and bridges 202 and 204, as illustrated. Bridges 202, 204, 206, and 208 may provide data packets in the NoC protocol to allow the crossbar 226 to manage data routing seamlessly, as all inputs are "packetized." As a result, the memory controller router 122 may use the crossbar 226 to manage the access to the memory channel interfaces 127 from data processing cores 104 that access the memory either directly or via the NoC 108 to provide high throughput access and prevent deadlocks, as detailed further in FIG. 9.

When providing direct access to a data processing core 104, the bridges may operate as master-slave pairs that coordinate operations. For example, bridge 202 may be slave to bridge 208, and bridge 204 may be slave to bridge 206. This coordination may allow transparent transport of data in a memory interface protocol through the router 122. Moreover, the memory controller router 122 may have two bypass routes 228A and 228B, which may directly connect port 212 to port 216, and port 220 to port 224, respectively. The bypass routes 228A and 228B may be used in situations in which the data processing cores 104 benefit from direct access to the memory controller 116 and/or the HBM 82. This may be used, for example, to provide deterministic latency between the data processing core 104 and the HBM 82, and/or to provide a high-bandwidth connection between the data processing core 104 and the HBM 82 by grouping multiple memory channels.

Figure 8:
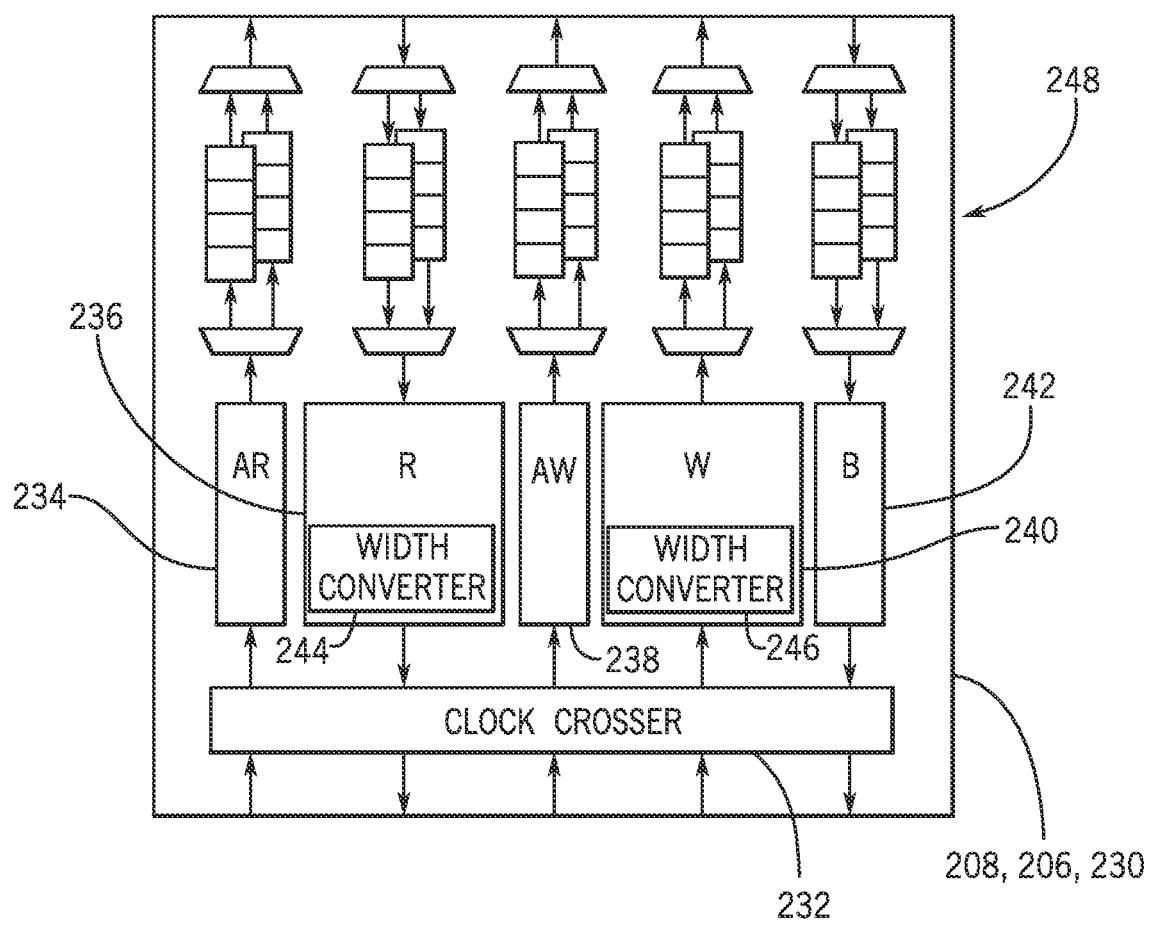
FIG. 8 is a diagram of a bridge circuit that may be used in the memory interface with dedicated NoC, in accordance with an embodiment.

FIG. 8 illustrates a diagram of device-side bridge 230, such as device-side bridges 206 and 208. The device side bridge may receive data from the programmable fabric in a memory interface protocol, such as the AXI4 protocol. The device-side bridge 230 may include clock crossing circuitry 232, which may adjust the data rate frequency to the clock domain of the memory controller NoC 118. The bridge 230 may also include protocol specific circuitry (e.g., AXI4 converter). In the example, the protocol specific circuitry may include a read address block 234, a data read block 236, a write address block 238, a data write block 240, and a write response block 242. Data buffers, such as the data read block 236 and the data write block 240 may include width converters 244 and 246 to provide data-rate matching and prevent blocking in the device-side bridge 230. The protocol specific circuitry may be converted to a packet format compatible with the memory controller router 122 by a virtual bridge channel 248. The use of the virtual bridge channel 248 with multiple FIFOs may mitigate head-of-line (HOL) blocking.

Figure 9:
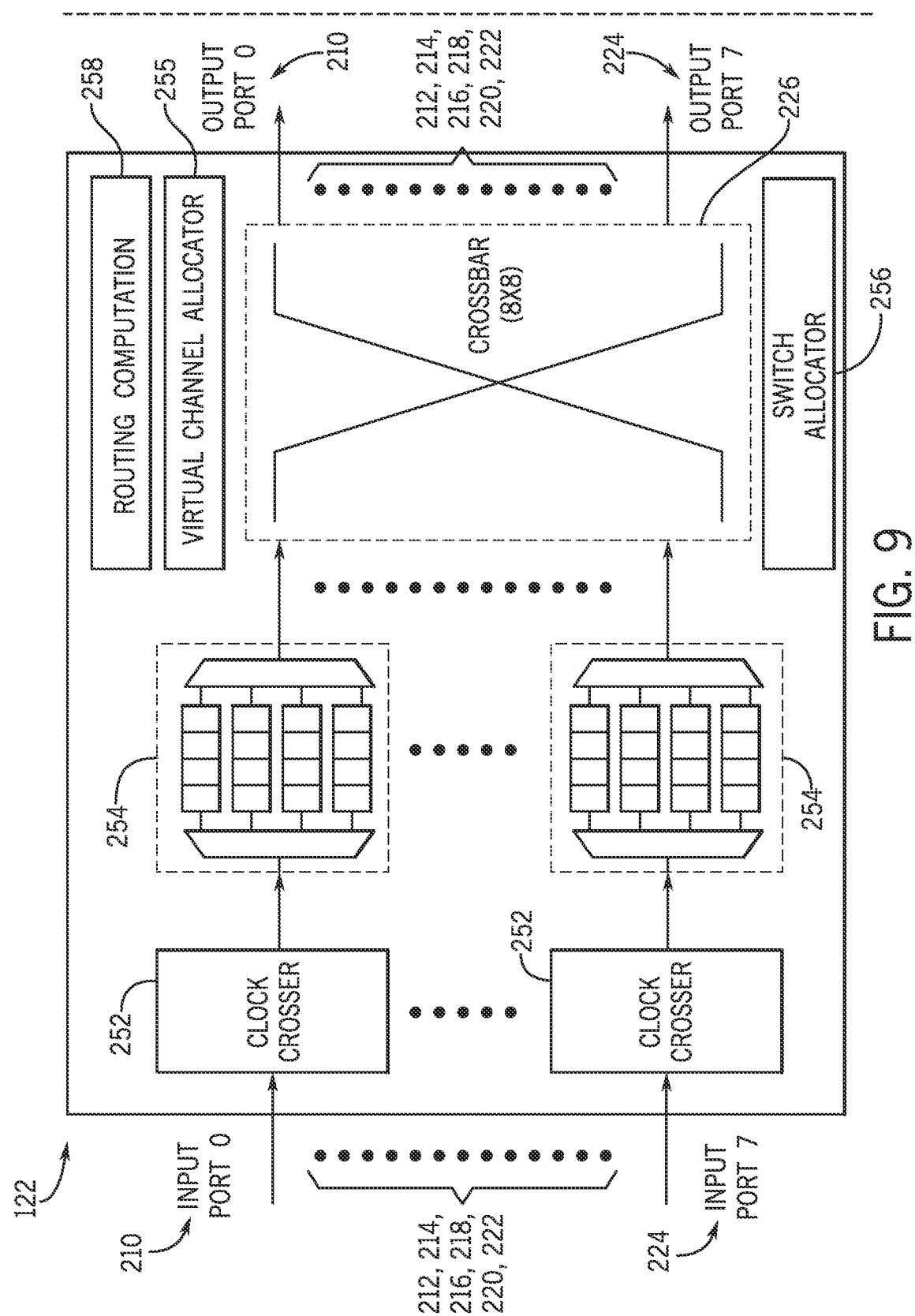
FIG. 9 is a logic diagram of a NoC router that may be used to support virtual channels for memory control, in accordance with an embodiment.

FIG. 9 provides a logical diagram for the dataflow through ports of the memory controller router 122 when employing the crossbar 226. The data may come in through any of the ports 210, 212, 214, 216, 218, 220, and 222 and be routed by the crossbar 226, to any of the ports 210, 212, 214, 216, 218, 220, and 222. To that end, the crossbar 226 may be an 8×8 crossbar. Each port may include clock crossing circuitry 252. The clock crossing circuitry 252 may facilitate the conversion of the rate of the data to the clock domain of the memory controller router 122. For example, the data may be received from a NoC router 112 of the NoC 108 or from a neighboring memory controller router 122, which may operate with a different data rate from the memory controller router. The clock crossing circuitry 252 may, thus, allow the routers (e.g., NoC routers 112, memory controller routers 122) to run at different frequencies and to connect to each other seamlessly.

Data from each port may also be managed by virtual channel circuitry 254, which may include dedicated FIFO buffers to help increase throughput and mitigate the occurrences of deadlock. A virtual channel allocator 255 may be used to manage the virtual channel circuitries 254 by inspecting each incoming data packet and/or data packet header and assigning it to the appropriate virtual channel. In order to manage the crossbar 226, a switch allocator 256 and/or a routing computation block 258 may be used. The switch allocator 256 may arbitrate the input-to-output routing requests through the crossbar 226 to assign routing resources. The routing computation block 258 may inspect the data packet headers and identify the physical output port that is appropriate for the data packet. As such, the routing computation block 258 may generate requests for routing for the switch allocator 256 and provide an optimized routing of data packets through the memory controller router 122.

Figure 10:
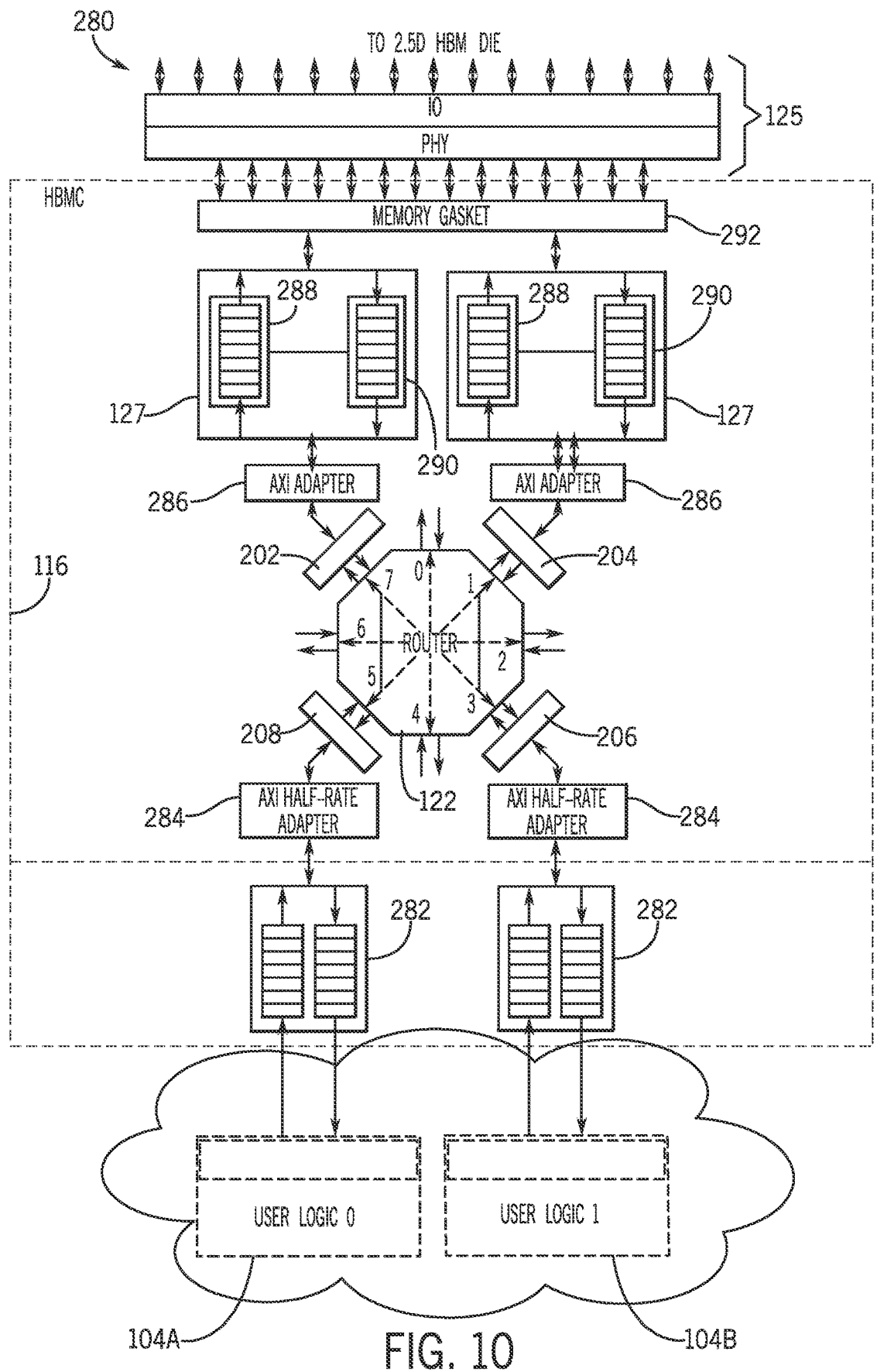
FIG. 10 is a logic diagram illustrating possible data paths through the router of the dedicated NoC in the memory interface, in accordance with an embodiment.

A diagram 280 in FIG. 10 illustrates how the memory controller NoC 118 may be configured to provide direct access to memory (e.g., HBM 82) by data processing cores of the programmable logic device 12, such as data processing cores 104A and 104B. In this diagram, the data packets may be sent directly from the data processing cores 104A and 104B to the router 122 of the memory controller NoC 118 in a format compatible with the memory controller. The data is initially sent to a rate-matching FIFO 282, that may decouple the operating frequency of the data processing cores 104A and 104B from the operating data frequency of the memory controller 116. The rate-matching FIFOs 282 may be configured independently and, as a result, data processing cores 104A and 104B may operate with different data frequencies and/or data frequency rates. Master half-rate adaptors 284 and slave adaptors 286, may be used in coordination to adjust the data rate of the memory controller 116 (e.g., HBM data rate) to a half-data rate clock that may be appropriate for operation in the bridges 202, 204, 206, and 208 and/or the memory controller router 122.

The data from the memory controller router 122 may be translated in the memory-side bridges 202 or 204 to a memory interface protocol and provided to the slave adaptors 286. From the slave adaptors 286, the data may be sent to the memory channel interfaces 127. Memory channel interfaces 127 may include write data buffers 288 and read data buffers 290, which may manage the data flow between the memory controller NoC 118 and the data link 125. A memory control gasket 292 may be used to assist the control of the data flow. The memory control gasket 292 may generate and/or receive HBM-compliant command and data to perform read and write operations over the data link 125.

Figure 11:
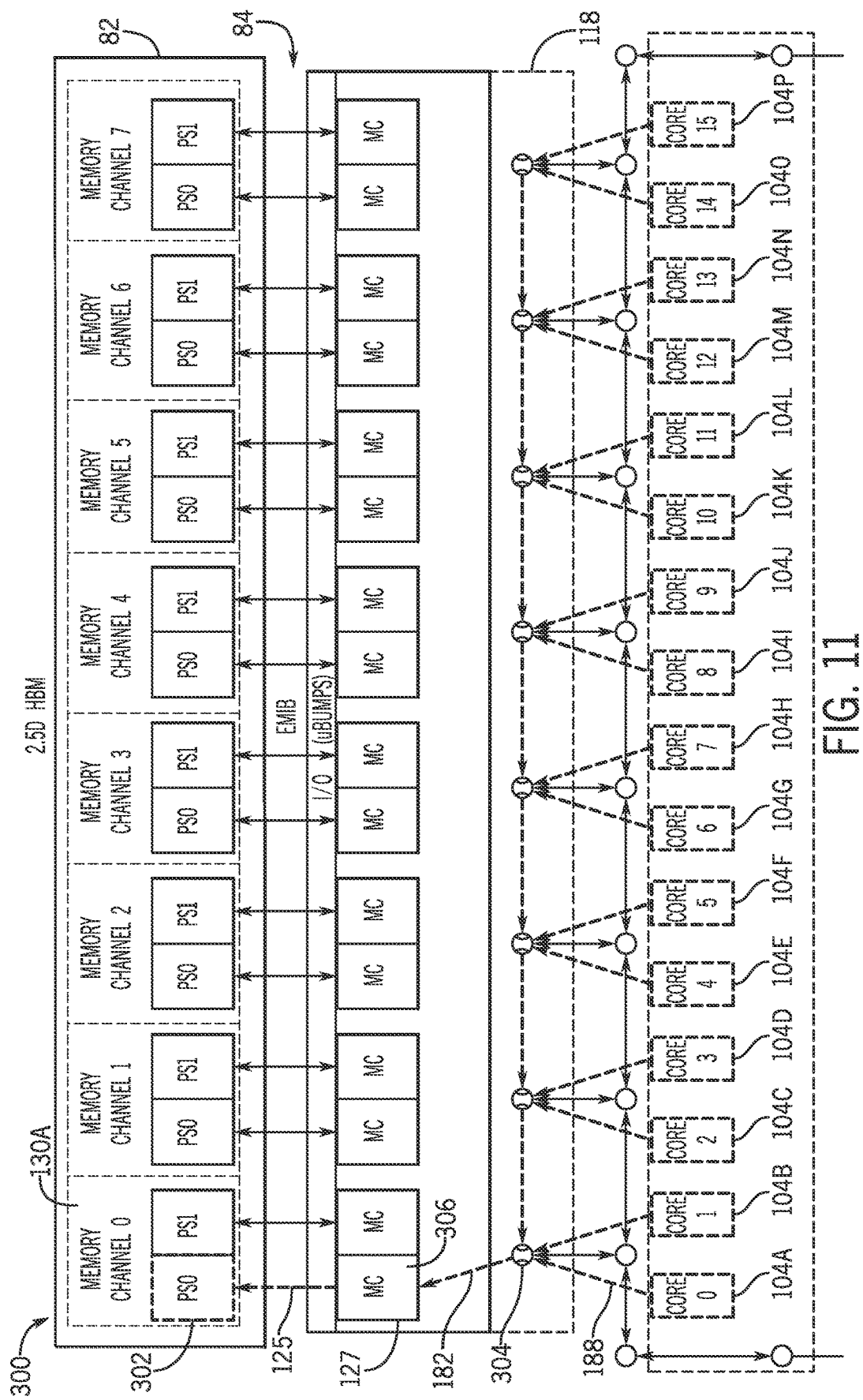
FIG. 11 is a diagram of a memory interface with a dedicated NoC configured to provide access to multiple cores, in accordance with an embodiment.
Figure 12:
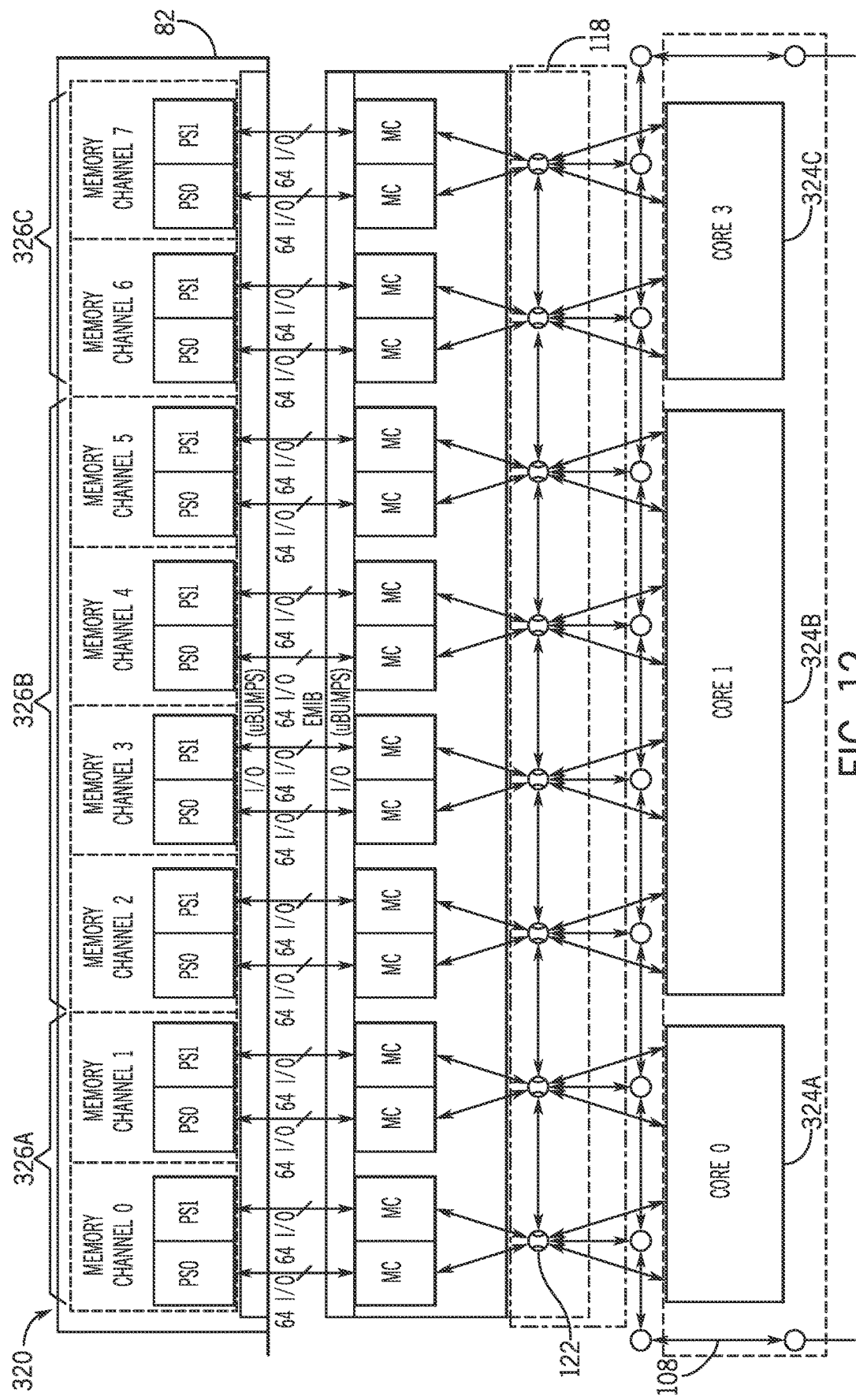
FIG. 12 is a diagram of a memory interface with a dedicated NoC configured to provide wide input/output (I/O) bandwidth by employing buffer bypass, in accordance with an embodiment.

The diagrams in FIGS. 11 and 12 illustrate two usage models that employ the dedicated memory controller NoC 118. The diagram 300 in FIG. 11 illustrates a system in which multiple data processing cores may access the same port 302 of the HBM 82 transparently using memory controller routers 122. Such application may be useful in platforms in which kernels or compute units may access a shared constant memory, such as in OpenCL platforms. Kernel programs and coefficients may be stored in a common memory channel and the presence of the memory controller NoC 118 may allow multiple kernels in multiple different data processing cores 104 to access the common channel (e.g., memory channel 130A).

As illustrated, each data processing core 104A-P may send data directly to a corresponding neighboring memory controller router 122. As discussed above, the data may be converted from a memory interface protocol to a NoC compatible protocol when sent to the neighboring router 122. The data packets may have a destination address associated with, for example, the router 304 that is adjacent to the memory channel controller 306 and coupled to the port 302. Each neighboring router 122 may then transmit the data via memory controller NoC 118 to the router 304. As the router 304 receives the data packets from the neighboring routers, the memory requests may be prioritized based on the header information and requests for memory access may be issued to the memory channel controller 306. As a result, all the data processing cores 104A-P may access the port 302 of the memory channel 130A.

The diagram 320 in FIG. 12 illustrates a system in which the data processing cores may be configured to access the HBM 82 through a wide memory interface. In the example, the data processing cores 324A, 324B, and 324C may be allocated to groups of memory channels 326A, 326B, and 326C, respectively. Data processing core 324A may access 4 data links 125 having, each, 64 I/O connections forming an interface with width of 256 I/O lines. Data processing core 324B may access 8 data links 125 having, each 64 I/O connections, forming an interface with width of 512 I/O lines. Data processing core 324C may access 8 data links 125 having, each, 64 I/O connections, forming an interface with width of 256 I/O lines. In some embodiments, the priority information in the header of packets may be used to provide synchronization between all the packets coming from the same core. This may be useful in situations where a router 122 is providing access via the wide interface from data processing cores 324A, 324B, or 324C, as well as to other data processing circuitry (e.g., data processing core 104A of FIG. 4) or to a processor (e.g., processor 52) via the NoC 108. In such situations, the virtual channels in the memory controller router 122 may be used to time the requests from the wide interface and/or the NoC 108 in a manner that is transparent for the data processing circuitry and/or the processors.

Figure 13:
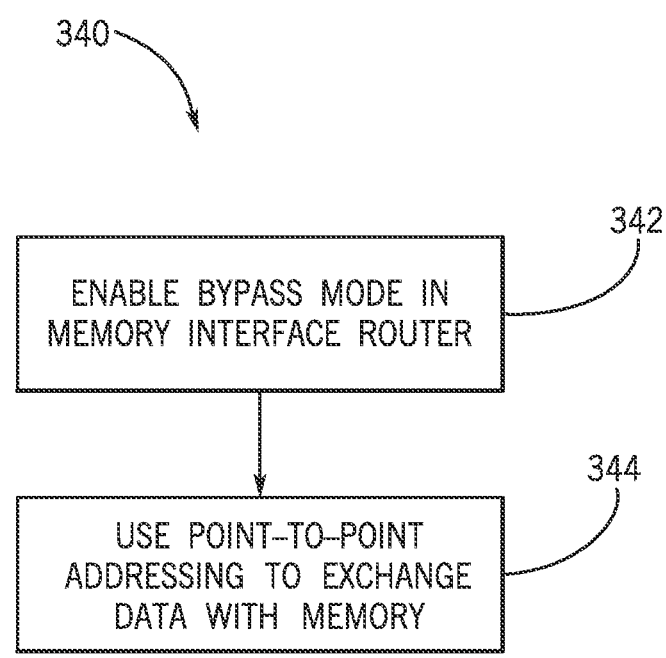
FIG. 13 is a flow chart for a method to configure the NoC routers to perform buffer bypass, in accordance with an embodiment.

To further facilitate the binding of the wide interfaces, the memory controller routers 122 may be configured in the bypass mode, as discussed above, to provide deterministic latency. A method 340 for enabling a bypass mode is illustrated in FIG. 13. In a process block 342, the bypass mode may be implemented in the memory controller router 122, as discussed above. The bypass mode may bind the input and the output ports of the router as illustrated in FIG. 7. In some embodiments, enabling the bypass mode may block the crossbar 226 and/or cause the buffering in the other virtual channels (e.g., virtual channel circuitry 254) to hold the data during the bypass mode transmission. For example, the crossbar 226 may assign higher priority to data transfers during the bypass mode. In process block 344, the data processing core may interact with the memory (e.g., HBM 82) through direct addressing, and with a deterministic latency, as discussed above. At the end of the data exchange, the router 122 may exit the bypass mode and resume regular routing.

The methods and devices of this disclosure may be incorporated into any suitable circuit. For example, the methods and devices may be incorporated into numerous types of devices such as microprocessors or other integrated circuits. Exemplary integrated circuits include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), and microprocessors, just to name a few.

Moreover, while the method operations have been described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of overlying operations is performed as desired.

The embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). For any claims containing elements designated in any other manner, however, it is intended that such elements are not to be interpreted under 35 U.S.C. 112(f).

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. An electronic device, comprising:
a high-bandwidth memory (HBM) device; and
an integrated circuit device coupled to the HBM device, the integrated circuit device comprising:
  programmable logic;
  a memory controller communicatively coupled to the HBM device and configurable to receive data from the HBM device;
  a first Network-on-Chip (NOC) coupled to the memory controller and configurable to receive the data from the memory controller, wherein the first NOC comprises a first router comprising a set of ports and crossbar circuitry configurable to link ports of the set of ports; and
  a second NOC coupled to the first NOC and configurable to receive the data from the first NOC and route the data to the programmable logic, wherein the first router of the first NOC is configurable to route data to a second router of the second NOC.

2. The electronic device of claim 1, wherein the first router of the first NOC comprises a first port configurable to exchange the data with the programmable logic and a second port configurable to exchange the data with the HBM device.

3. The electronic device of claim 1, wherein the memory controller comprises a crossbar disposed between the programmable logic and a plurality of memory channels of the HBM device.

4. The electronic device of claim 1, wherein the integrated circuit device comprises a plurality of processing cores, wherein a first data processing core of the plurality of processing cores is configurable to access the memory controller through the second NOC, and wherein a second data processing core of the plurality of processing cores is configurable to access the memory controller through a direct interconnect coupled to the first router of the second NOC.

5. The electronic device of claim 4, wherein the first data processing core comprises digital signal processing (DSP) circuitry, a reduced instruction set computer (RISC) processor core, an advanced RISC machine (ARM) processor core, or a combination thereof.

6. The electronic device of claim 1, comprising a memory interface comprising a virtual channel configurable to prioritize a first data packet of the data.

7. The electronic device of claim 6, wherein the memory interface is configurable to operate in accordance with an Advanced Extensible Interface 4 (AXI4) protocol, an AXI3 protocol, an AXI-Lite protocol, an AXI Coherency Extensions (ACE) protocol, an Avalon Interface protocol, or a combination thereof.

8. The electronic device of claim 1, wherein the first NOC comprises a first plurality of routers in a horizontal configuration, and wherein the second NOC comprises a second plurality of routers in a vertical configuration.

9. The electronic device of claim 1, wherein the second NOC is configurable to:

receive the data from the first router of the first NOC through the second router of the second NOC; and transfer the data to the programmable logic or to one or more processing cores of a plurality of processing cores of the integrated circuit device.

10. An electronic device, comprising:
a high-bandwidth memory (HBM) device; and
an integrated circuit device coupled to the HBM device, the integrated circuit device comprising:
programmable logic;
a plurality of processing cores;
a memory controller communicatively coupled to the HBM device and configured to receive data from the HBM device;
a first Network-on-Chip (NOC) configurable to communicatively couple the integrated circuit device to the HBM device; and
a second NOC coupled to the programmable logic and configurable to:
receive data from a first router of the first NOC through a second router of the second NOC; and
transfer the data to the programmable logic or to one or more processing cores of the plurality of processing cores, wherein the first NOC comprises a first plurality of routers in a horizontal configuration, and wherein the second NOC comprises a second plurality of routers in a vertical configuration.

11. The electronic device of claim 10, wherein the memory controller comprises hardened circuitry.

12. The electronic device of claim 10, wherein the plurality of processing cores comprises a digital processor core, a reduced instruction set computer (RISC) processor core, an advanced RISC machine (ARM) processor core, or a combination thereof.

13. The electronic device of claim 10, wherein each router of the first plurality of routers and each router of the second plurality of routers comprises a set of ports and crossbar circuitry configurable to link ports of the set of ports.

14. An electronic device comprising:
a high-bandwidth memory (HBM) device; and
an integrated circuit device coupled to the HBM device, the integrated circuit device comprising:
programmable logic;
a plurality of data processing cores;
a memory controller communicatively coupled to the HBM device and configured to receive data from the HBM device;
a first Network-on-Chip (NOC) configurable to communicatively couple the integrated circuit device to the HBM device; and
a second NOC coupled to the first NOC and configurable to receive a data packet from the first NOC and route the data packet to the programmable logic or to one or more of the plurality of data processing cores, wherein a first router of the second NOC is configurable to receive the data packet from a second router of the first NOC and transfer the data to a third router of the second NOC based on a destination address of the data packet.

15. The electronic device of claim 14, wherein the plurality of data processing cores comprises a digital processing core, a reduced instruction set computer (RISC) processor core, an advanced RISC machine (ARM) processor core, or a combination thereof.

16. The electronic device of claim 14, comprising a bridge coupled to the memory controller, wherein the bridge is configurable to convert the data packet between a NOC protocol and a memory interface protocol, wherein the memory interface protocol comprises an Advanced Extensible Interface 4 (AXI4) protocol, an AXI3 protocol, an AXI-Lite protocol, an AXI Coherency Extension (ACE) protocol, an Avalon Interface protocol, or a combination thereof.

17. The electronic device of claim 14, wherein the memory controller comprises a first clock crossing circuitry configurable to couple a first router of the first NOC to a first data processing core of the plurality of data processing cores, wherein the first data processing core operates in a first clocking domain and the first router operates in a memory controller clock domain.

18. The electronic device of claim 17, wherein the first router comprises a set of ports and crossbar circuitry configurable to link ports of the set of ports.

19. An electronic device, comprising:
a high-bandwidth memory (HBM) device; and
an integrated circuit device coupled to the HBM device, the integrated circuit device comprising:
programmable logic;
a memory controller communicatively coupled to the HBM device and configurable to receive data from the HBM device;
first Network-on-Chip (NOC) circuitry coupled to the memory controller and comprising a first plurality of routers, wherein the first NOC circuitry is configurable to receive the data from the memory controller and route the data horizontally through the first plurality of routers; and
second NOC circuitry coupled to the first NOC circuitry and comprising a second plurality of routers, wherein the second NOC circuitry is configurable to receive the data from the first NOC circuitry and route the data vertically through the second plurality of routers to the programmable logic.

20. The electronic device of claim 19, wherein a first router of the first plurality of routers is configurable to route the data to a second router of the second plurality of routers.

21. The electronic device of claim 19, wherein:
the first NOC circuitry comprises a first router having a first port configurable to exchange data with the programmable logic and a second port configurable to exchange data with the HBM Device.

22. The electronic device of claim 19, comprising one or more processors coupled to the second NOC circuitry and configurable to exchange data with the second NOC circuitry.

23. The electronic device of claim 22, wherein the one or more processors comprise a reduced instruction set computer (RISC) processor or an advanced RISC machine (ARM) processor.

24. The electronic device of claim 20, wherein the first router of the first plurality of routers comprises a set of ports and crossbar circuitry configurable to link ports of the set of ports.

25. The electronic device of claim 20, wherein the second router of the second plurality of routers is configurable to receive the data from a second router of the first plurality of routers and transfer the data to a third router of the second plurality of routers based on a destination address of the data.

* * * * *